United States Patent [19]

Suzuki et al.

[11] Patent Number: 5,605,962
[45] Date of Patent: Feb. 25, 1997

[54] FLAME RETARDING RESIN COMPOSITION

[75] Inventors: Masanori Suzuki; Hiroyuki Itoh; Koichi Sumi; Yoichi Kamoshida; Shigeru Abe; Seiichi Atomori; Tateki Furuyama, all of Tokyo, Japan

[73] Assignee: Japan Synthetic Rubber Co., Ltd., Tokyo, Japan

[21] Appl. No.: 201,031

[22] Filed: Feb. 24, 1994

[30] Foreign Application Priority Data

Feb. 26, 1993 [JP] Japan ................................... 5-061216

[51] Int. Cl.$^6$ .............................. C08F 8/40; C08C 19/24; C08L 61/04; C08L 55/02
[52] U.S. Cl. ........................ 525/70; 525/77; 525/80; 525/83; 525/134; 525/139; 525/142; 525/143; 525/145; 525/221; 525/227; 525/238; 525/241; 525/329.1; 525/330.4; 525/329.8; 525/332.1; 525/333.3; 525/340
[58] Field of Search ................... 525/70, 77, 80, 525/83, 134, 139, 142, 143, 145, 221, 227, 238, 241, 329.1, 330.4, 329.8, 332.1, 333.3, 340

[56] References Cited

U.S. PATENT DOCUMENTS 5,240,978  8/1993  Fuhr et al. ........................ 524/141
5,290,836  3/1994  Truyen ............................. 524/123

FOREIGN PATENT DOCUMENTS 0463495  1/1992  European Pat. Off. .
0522653  1/1993  European Pat. Off. .
0538950  4/1993  European Pat. Off. .

OTHER PUBLICATIONS

Database WPI, Derwent Publications, AN 87–217758, JP-A-62 143 961, Jun. 27, 1987.
Database WPI, Derwent Publications, AN 87–034086, JP-A-61 291 643, Dec. 22, 1986.
Database WPI, Derwent Publications, AN 94–072078, JP-A-6 025 506, Feb. 1, 1994.

*Primary Examiner*—W. Robinson H. Clark
*Attorney, Agent, or Firm*—Oblon, Spivak, McClelland, Maier & Neustadt, P.C.

[57] ABSTRACT

A flame retarding resin composition comprising 100 parts by weight of a specific rubber-reinforced resin, 1–200 parts by weight of a phenol resin, 1–200 parts by weight of an organic phosphorus compound, 1–50 parts by weight of a nitrogen-containing compound, 0–40 parts by weight of an oligomer-type polymer containing a functional group, 0–30 parts by weight of a metal compound, a silicon compound, and/or polytetrafluoroethylene, and 0–300 parts by weight of a styrene-type resin. The composition has high impact resistance, excellent heat resistance, and a superior self-fire-extinguishing characteristic.

20 Claims, No Drawings

FLAME RETARDING RESIN COMPOSITION

BACKGROUND OF THE INVENTION

1. Field of the Invention

The present invention relates to a flame retarding resin composition containing organo-phosphorus compound as a flame retarding agent, having high impact resistance, excellent heat resistance, and a superior self-fire-extinguishing characteristic.

2. Description of the Background Art

Conventionally, thermoplastic resins of which the impact resistance have been promoted by a rubbery polymer are known as resins generally called ABS resins. Such thermoplastic resins must have flame retardancy depending on use to which they are directed. This is particularly applicable when thermoplastic resins are used for household products, electrical appliances, OA equipment, automotive products, and building materials. A commonly known method of imparting flame retardancy to thermoplastic resins, such as ABS resins, consists of blending a flame retarding agent. In many cases, flame retarding agents comprise a halogen-containing compound such as a brominated diphenyl oxide compound, a brominated polycarbonate compound, or the like. A superior flame retarding effect is demonstrated when these flame retarding agents are blended together with antimony trioxide. However, the addition of said halogen-containing compound to resin compositions causes generation of noxious compounds, when the resin compositions are molded or burnt. In particular, generation of dioxin and furan which are fatally poisonous to human causes a serious problem.

As a solution to this type of problem, the addition of a compound containing phosphorus and/or nitrogen to the rubber-reinforced thermoplastic resin material, including ABS resins, as a flame retarding agent in place of a halogen-containing compound has been proposed. These compounds, however, are less effective in the flame-retarding effect than halogen-containing compounds. In addition, the flame-retarding effect of these compounds is especially low when they are used for styrene-type rubber-reinforced thermoplastic resins, such as ABS resin, so that a large amount of these compounds must be added in order to achieve an adequate flame-retarding effect. The addition of a large amount of the compounds containing phosphorus and/or nitrogen, however, conspicuously impairs impact resistance and heat resistance of the resin.

In an effort in eliminating this drawback, German Patent 3,401,835 A proposed a blend of a thermoplastic graft copolymer, a char-forming novolac resin, a phosphorus compound, and a melamine, as a polymer composition having a high flame retardancy. This polymer composition, however, produces melamine particles oozing from the resin, resulting in "blooming", by which the plastic surface is covered with deposited crystals. In addition, the use of phosphorus compounds which exhibit a plasticizing effect, remarkably impairs the heat resistance. Reducing the amount of phosphorus compounds improves the heat resistance, but does not provide a sufficient flame retarding effect. Therefore, development of a polymer composition exhibiting a high flame retarding effect without impairing impact resistance, heat resistance, and the like inherently possessed by plastics has been desired.

The present inventors have undertaken extensive studies in order to solve the above-mentioned problems and found that a flame retarding resin composition having high impact resistance, excellent heat resistance, and a superior self-fire-extinguishing characteristic can be obtained by a suitable combination of polymer blends having a specific composition.

SUMMARY OF THE INVENTION

Accordingly, an object of the present invention is to provide a flame retarding resin composition comprising, (Z) 100 parts by weight of at least one rubber-reinforced resin selected from,
(A) a rubber-reinforced resin, which is:
a graft copolymer obtained by the polymerization of a monomer mixture comprising (a) at least one aromatic vinyl compound and (b) at least one cyanated vinyl compound in the presence of a rubbery polymer having a gel content of 2–50% by weight, or
a mixture of this graft polymer and a polymer obtained by the polymerization of at least one monomer selected from the group consisting of (a) aromatic vinyl compounds, (b) cyanated vinyl compounds, and (c) monomers containing a functional group,
wherein the content of the monomers containing functional group (c) in component (A) is 0–40% by weight, and
(B) a rubber-reinforced resin, which is:
a graft copolymer obtained by the polymerization of a monomer mixture comprising (a) at least one aromatic vinyl compound and (b) at least one cyanated vinyl compound in the presence of a rubbery polymer having a gel content of at least 2% by weight, or
a mixture of this graft copolymer and a polymer obtained by the polymerization of at least one monomer selected from the group consisting of (a) aromatic vinyl compounds, (b) cyanated vinyl compounds, (c) monomers containing a functional group, and (d) maleimide compounds,
wherein the contents of the monomers containing a functional group (c) and the maleimide compounds (d) in component (B) is 0–40% by weight and 5–50% by weight, respectively;
(C) 1–200 parts by weight of a phenol resin; and
(D) 1–200 parts by weight of an organic phosphorus-containing compound.

In a preferred embodiment, the flame retarding resin composition of the present invention further comprises, for 100 parts by weight of the rubber-reinforced resin (R), one or more compounds selected from the group consisting of,
(E) less than 50 parts by weight of a compound containing nitrogen;
(F) less than 40 parts by weight of an oligomer-type polymer containing a functional group;
(G) less than 30 parts by weight of one or more compounds selected from the group consisting of,
(G-1) compounds containing metal,
(G-2) compounds containing silicon, and
(G-3) polytetrafluoroethylene; and
(H) less than 300 parts by weight of one or more styrene-type resins selected from the group consisting of,
(H-1) maleic anhydride-styrene copolymer,
(H-2) syndiotactic polystyrene, and
(H-3) resins containing -methylstyrene.

As a particularly preferred embodiment, the present invention provides a flame retarding resin composition comprising, (Z) 100 parts by weight of at least one rubber-reinforced resin selected from,
(A) a rubber-reinforced resin, which is:
a graft copolymer obtained by the polymerization of a monomer mixture comprising (a) at least one aromatic vinyl compound and (b) at least one cyanated vinyl compound in the presence of a rubbery polymer having a gel content of 2–50% by weight, or
a mixture of this graft polymer and a polymer obtained by the polymerization of at least one monomer selected from the group consisting of (a) aromatic vinyl compounds, (b) cyanated vinyl compounds, and (c) monomers containing a functional group,
wherein the content of the monomers containing functional group (c) in component (A) is 0–40% by weight, and
(B) a rubber-reinforced resin, which is:
a graft copolymer obtained by the polymerization of a monomer mixture comprising (a) at least one aromatic vinyl compound and (b) at least one cyanated vinyl compound in the presence of a rubbery polymer having a gel content of at least 2% by weight, or
a mixture of this graft copolymer and a polymer obtained by the polymerization of at least one monomer selected from the group consisting of (a) aromatic vinyl compounds, (b) cyanated vinyl compounds, (c) monomers containing a functional group, and (d) maleimide compounds,
wherein the contents of the monomers containing a functional group (c) and maleimide compounds (d) in component (B) is 0–40% by weight and 5–50% by weight, respectively;
(C) 1–50 parts by weight of a phenol resin;
(D) 1–50 parts by weight of an organic phosphorus-containing compound;
(F) 0.05–40 parts by weight of an oligomer-type polymer containing a functional group; and
(G) 0.5–30 parts by weight of one or more compounds selected from the group consisting of,
(G-1) compounds containing metal,
(G-2) compounds containing silicon, and
(G-3) polytetrafluoroethylene.

Other objects, features and advantages of the invention will hereinafter become more readily apparent from the following description.

DETAILED DESCRIPTION OF THE INVENTION AND PREFERRED EMBODIMENTS

The rubber-reinforced resin (Z) used in the present invention comprises the following components (A) or (B), or both (A) and (B).

Component (A)

Component (A) is a rubber-reinforced resin, which is (i) a graft copolymer obtained by the polymerization of a monomer mixture comprising (a) at least one aromatic vinyl compound, (b) at least one cyanated vinyl compound, and, optionally, (c) at least one monomer containing a functional group, in the presence of a rubbery polymer having a gel content of 2–50% by weight, preferably 5–40% by weight, and more preferably 5–30% by weight, or (ii) a mixture of this graft polymer (i) and a polymer obtained by the polymerization of at least one monomer selected from the group consisting of (a) aromatic vinyl compounds, (b) cyanated vinyl compounds, and (c) monomers containing a functional group. The content of the monomers containing functional group (c) in this component (A) is 0–40% by weight, preferably 0.1–40% by weight, and more preferably 0.5–40% by weight.

If the gel content of said rubbery polymer is less than 2% by weight, the impact strength of the resulting flame retarding resin composition is low. If this amount is more than 50% by weight, a sufficient flame retarding effect cannot be obtained. In this instance, if a large amount of organophosphorus compound (D) is added in order to improve the flame retarding effect to an acceptable level, the heat resistance of the resulting resin composition is impaired.

If the content of the monomers containing a functional group (c) in component (A) is more than 40% by weight, the heat resistance during molding operation and the molding processability are poor.

The graft ratio of the graft polymer in component (A) is preferably 5–150% by weight, and more preferably 8–120% by weight. If the graft ratio is smaller than 50%, the effect of the addition of the rubbery component is not sufficiently exhibited, e.g., impact resistance is insufficient; if it is greater than 150%, there is a tendency for dripping to occur during combustion.

The graft ratio is defined to be a percentage determined by the following formula, $$\text{Graft Ratio (\%)} = \{(y-x)/x\} \times 100$$

wherein x is the amount of rubbery components in 1 g of the graft polymer and y is the methyl ethyl ketone insoluble components in 1 g of the graft polymer.

Component (B)

Component (B) is a rubber-reinforced resin, which is (i) a graft copolymer obtained by the polymerization of a monomer mixture comprising (a) at least one aromatic vinyl compound, (b) at least one cyanated vinyl compound, and, optionally, (c) a monomer containing a functional group or (d) a maleimide compound, or both (c) and (d), in the presence of a rubbery polymer having a gel content of at least 2% by weight, preferably at least 50% by weight, and more preferably at least 80% by weight, or (ii) a mixture of this graft copolymer and a polymer obtained by the polymerization of at least one monomer selected from the group consisting of (a) aromatic vinyl compounds, (b) cyanated vinyl compounds, (c) monomers containing a functional group, and (d) maleimide compounds. The content of the monomers containing a functional group (c) in rubber-reinforced resin (B) is 0–40% by weight, preferably 0.1–40% by weight, and more preferably 0.5–40% by weight; and the content of the maleimide compounds (d) is 5–50% by weight, preferably 10–50% by weight, and more preferably 15–45% by weight.

If the gel content in the rubber-reinforced resin (B) is less than 2% by weight, the impact strength of the resulting flame retarding resin composition is poor.

The graft ratio of the graft polymer in rubber-reinforced resin (B) is preferably 5–150% by weight, and more preferably 8–120% by weight.

If the content of the monomers containing a functional group (c) in component (B) is more than 40% by weight, the heat resistance during molding operation and the molding processability are poor.

With the content of the maleimide compounds (d) of the above range in the rubber-reinforced resin (B), superior heat resistance and flame retarding effect can be achieved without significantly scarifying the moldability.

Gel as used in the term "gel content" in this invention means insoluble components when the rubber-reinforced resin (A) or (B) is dissolved in a solvent such as methyl ethyl ketone.

The amount of the rubbery polymer in the graft copolymer of rubber-reinforced resins (A) or (B) used in the composition of the present invention is preferably 5–60% by weight, more preferably 10–50% by weight. If the amount of the rubbery polymer is smaller than 5% by weight, the impact resistance is inadequate; if it is greater than 60% by weight, the flame-retarding effect is impaired.

Regarding the amounts of aromatic vinyl compounds (a) and cyanated vinyl compounds (b) used in the rubber-reinforced resin (A) or (B), the aromatic vinyl compounds are used in an amount of 45–95% by weight, and preferably 55–80% by weight, and the cyanated vinyl compounds are used in an amount of 55–5% by weight, and preferably 45–20% by weight.

The intrinsic viscosity [η] of the matrix resin in the rubber-reinforced resin (R), measured in methyl ethyl ketone at 30° C., is preferably 0.1 to 1.5 dl/g, and more preferably 0.3 to 1.0 dl/g. If the intrinsic viscosity [η] is smaller than 0.1 dl/g, the impact strength is insufficient; if it is greater than 1.5 dl/g, the molding processability is inadequate.

The matrix resin in this invention is defined as the resin components other than grafted rubber components in the rubber-reinforced resin (Z), and the intrinsic viscosity [η] can be determined by measuring the amount of components soluble in methyl ethyl ketone contained in the rubber-reinforced resins by a conventional method.

The graft polymers (i) or the polymers in the mixture (ii) of the rubber-reinforced resins (A) and (B) can be obtained by block polymerization, solution polymerization, suspension polymerization, emulsion polymerization, precipitation polymerization, or the like. Combinations of these polymerization methods can also be applicable.

Components for forming (A) and (B)

Examples which can be given of rubbery polymers used for manufacturing the rubber-reinforced resins (A) and (B) include polybutadiene, butadiene-styrene copolymers, polyisoprene, butadiene-acrylonitrile copolymers, ethylene-propylene-(non-conjugated diene) copolymers, isobutylene-isoprene copolymers, acryl rubbers, styrene-butadiene-styrene block copolymers, styrene-butadiene-styrene radial tereblock copolymers, styrene-isoprene-styrene block copolymers, hydrogenated diene (block, random, or homo) polymers such as SEBS and the like, polyurethane rubbers, silicone rubbers, and the like. Of these, polybutadiene, butadiene-styrene copolymers, ethylene-propylene-(non-conjugated diene) copolymers, hydrogenated diene polymers, and silicone rubbers are preferred.

Examples of the aromatic vinyl compounds (a) which can be used for preparing the rubber-reinforced resins (A) and (B) include styrene, -methylstyrene, α-ethylstyrene, methyl-α-methylstyrene, bromostyrene, dibromostyrene, tribromostyrene, chlorostyrene, dichlorostyrene, trichlorostyrene, and sodium styrene sulfonate. Among these, styrene and α-methyl-styrene are preferred.

The use of an alkoxystyrene (a-1) or an alkyl-substituted styrene (a-2) as a part or whole of the aromatic vinyl compounds (a) can greatly improve the flame retarding effect of the resin composition.

Examples of the alkoxystyrene (a-1) include t-butoxystyrene, methoxystyrene, and ethoxystyrene, with t-butoxystyrene being particularly preferred. Methylstyrene, dimethylstyrene, ethylstyrene, diethylstyrene, o-methylstyrene, m-methylstyrene, p-methylstyrene are given as examples of the alkyl-substituted styrene (a-2). Of these, p-methylstyrene is especially preferred.

The content of (a-1) and/or (a-2) in component (R) is 0.5–50% by weight, preferably 1–40% by weight, and more preferably 2–35% by weight. If this content exceeds 50% by weight, the moldability is poor.

Examples which can be given of the cyanated vinyl monomers (b) include acrylonitrile, methacrylonitrile, and the like. Among these, acrylonitrile is particularly preferred.

The monomer containing a functional group (c) used for producing said component (R) is a monomer containing at least one group selected from epoxy group, hydroxy group, carboxyl group, and amide group. Glycidylmethacrylate, glycidylacrylate, and epoxystyrene are given as examples of epoxy group-containing monomers (c-1). Examples of the hydroxy group-containing monomer (c-2) include 2-hydroxyethylmethacrylate, 2-hydroxyethylacrylate, p-hydroxystyrene, and N-p-hydroxyphenylmaleimide. Acrylic acid, methacrylic acid, and 2-methacryloyloxyethyl succinate are given as examples of carboxyl group-containing monomers (c-3), and acrylamide and methacrylamide are given as amide group-containing monomers (c-4). As specific compound (c-5), a compound of the following formula is given.

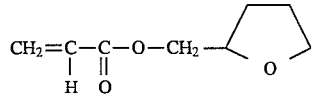

These monomers containing a functional group (c) greatly contribute to the improvement in the frame retarding effect of the resin composition of the present invention. Specifically, they exhibit the effects of preventing dripping when the resin is burnt without impairing the impact strength and the moldability.

Examples of the maleimide compounds (d) include maleimide, N-methylmaleimide, N-ethylmaleimide, N-propylmaleimide, N-isopropylmaleimide, N-laurylmaleimide, N-cyclohexylmalemide, N-phenylmaleimide, N-(2-methylphenyl)maleimide, N-(2,6-diethylphenyl)maleimide, N-(4-carboxyphenyl)maleimide, N-(4-bromophenyl)maleimide, tribromophenylmaleimide, N-(4-chlorophenyl)maleimide, and the like. Among these, N-phenylmaleimide and N-cyclohexylmaleimide are particularly desirable.

The polymers forming rubber-reinforced resin (A) or (B) may be a copolymer further comprising a (meth)acrylic acid ester. Examples which can be given of the (meth)acrylic acid ester include methyl acrylate, ethyl acrylate, butyl acrylate, methyl methacrylate, ethyl methacrylate, and butyl methacrylate. Methyl methacrylate and butyl acrylate are particularly preferred.

Component (C)

Novolac-type phenol resins and resol-type phenol resins are given as phenol resins, which is the component (C) of the frame retarding resin composition of the present invention.

The novolac-type phenol resins are polymers with a comparatively low molecular weight and containing no free methylol group, obtained by the condensation of a substituted or unsubstituted phenol compound and formaldehyde or the like. These novolac-type phenol resins are described in Encyclopedia of Polymer Science and Engineering, vol. 11, pp 45–95. Specific examples of the substituted phenol compounds include aryl-substituted phenol compounds, such as cresol, resorcinol, and p-phenylphenol; alkylated phenol compounds, such as p-t-butylphenol, p-octylphenol, and xylenol; and the like. In the present invention, novolac phenol resins prepared from phenol, cresol, or resorcinol, or a mixture of these are preferred.

The resol-type phenol resins are polymers with a comparatively low molecular weight and containing 3–20% by weight of free methylol group, obtained by the condensation of a substituted or unsubstituted phenol compound and formaldehyde or the like. Examples of the substituted phenol compounds are aryl-substituted phenol compounds, such as cresol, resorcinol, and p-phenylphenol; and alkylated phenol compounds, such as p-t-butylphenol, p-octylphenol, and xylenol. In the present invention, resol-type phenol resins prepared from phenol, cresol, or resorcinol, or a mixture of these are preferred.

Preferable average molecular weight of component (C) is in the range of 300–10,000.

The amount of the component (C) used in the composition of the present invention is 1–200 parts by weight, preferably 1–100 parts by weight, and more preferably 5–50 parts by weight, for 100 parts by weight of the rubber-reinforced resin (R). If the amount of phenol-type resins (C) is less than 1 part by weight, a resin composition having sufficient flame retarding properties cannot be obtained; if it is more than 200 parts by weight, the resin composition exhibits low heat resistance.

Component (D)

Illustrating the organo-phosphorus compound, which is the component (D) in the present invention, phosphates, such as triphenylphosphate, and phosphites, such as triphenylphosphite, are given as typical examples of the organo-phosphorus compound. Other examples of organo-phosphorus compounds are compounds having at least one of the structural units represented by the following formulas (I) to (IV).

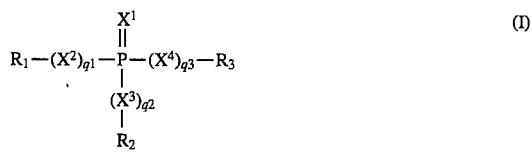
(I)

wherein $R_1$ to $R_3$ individually represent a hydrocarbon residue which may be substituted by halogen atoms; $X^1$ to $X^4$ individually represent an oxygen atom or a sulfur atom; and $q_1$ to $q_3$ individually indicates 0 or 1.

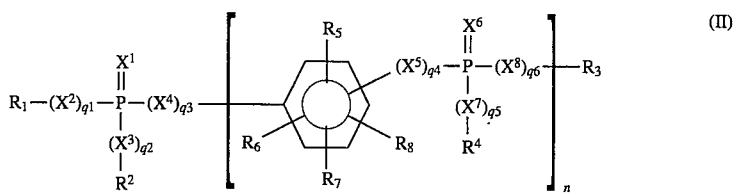
(II)

wherein $R_1$ to $R_4$ individually represent a hydrocarbon residue which may be substituted by halogen atoms; $R_5$ to $R_8$ individually represent a hydrogen atom, a halogen atom, or a hydrocarbon residue; $X^1$ to $X^8$ individually represent an oxygen atom or a sulfur atom; and $q_1$ to $q_6$ are 0 or 1, and n indicates a number of 1 to 30, representing a polymerization degree.

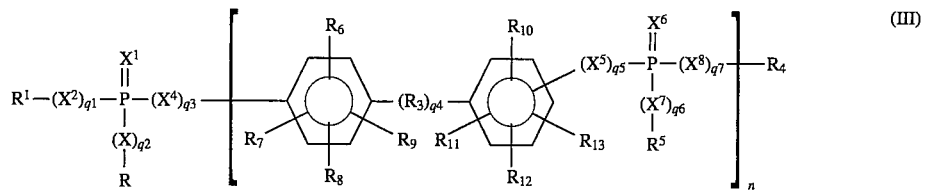
(III)

wherein $R_1$ to $R_5$ individually represent a hydrocarbon residue which may be substituted by halogen atoms; $R_6$ to $R_{13}$ individually represent a hydrogen atom, a halogen atom, or a hydrocarbon residue; $X^1$ to $X^8$ individually represent an oxygen atom or a sulfur atom; $q_1$ to $q_7$ represent 0 or 1; and n indicates a number of 1 to 30, representing a polymerization degree.

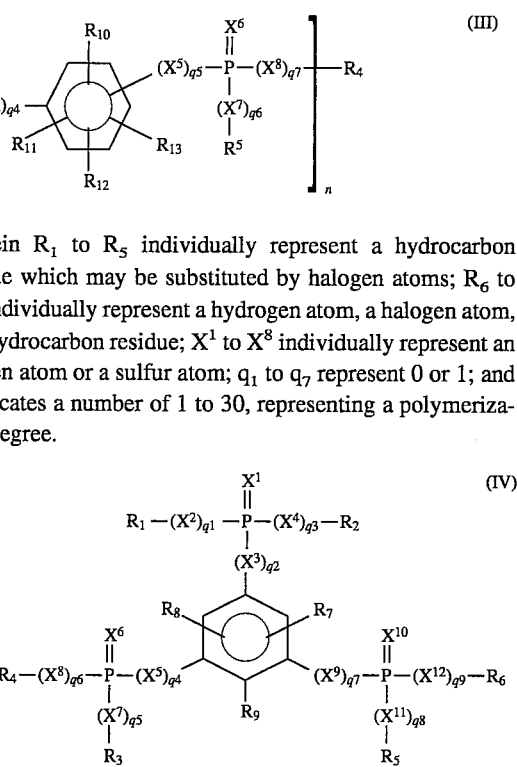
(IV)

wherein $R_1$ to $R_6$ individually represent a hydrocarbon residue which may be substituted by halogen atoms; $R_7$ to $R_9$ individually represent a hydrogen atom, a halogen atom, or a hydrocarbon residue; $X^1$ to $X^{12}$ individually represent an oxygen atom or a sulfur atom; and $q_1$ to $q_9$ represent 0 or 1.

These organo-phosphorus compounds (D) may be used either individually or two or more of them may be used in combination.

Preferred organo-phosphorus compounds used in the present invention are triphenylphosphate, triphenylthiophosphate of the following formula (V), trixylenylphosphate, trixylenylthiophosphate of the following formula (VI), hydroquinone bis(diphenylphosphate), resorcinol bis(diphenylphosphate), and the like.

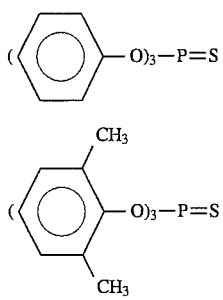

The amount of organo-phosphorus compound (D) used in the composition of the present invention is 1–200 parts by weight, preferably 1–100 parts by weight, and more preferably 5–50 parts by weight, for 100 parts by weight of said rubber-reinforced resin (R). If the amount of organo-phosphorus compounds is less than 1 part by weight, a sufficient flame retarding effect cannot be obtained; if it is more than 200parts by weight, the resin exhibits low heat resistance and impact resistance.

Component (E)

As the compound containing nitrogen, the component (E), triazine, triazolysine, urea, guanidine, amino acids, melamine, isocyanates, and derivatives of these can be given as examples.

These nitrogen-containing compounds (E) can be used either singly or in combination of two or more of them.

The amount of the component (E) used in the composition of the present invention is 0–50 parts by weight, preferably 1–30 parts by weight, and more preferably 2–20 parts by weight, for 100 parts by weight of said rubber-reinforced resin (R). If the amount of the nitrogen-containing compounds is more than 50 parts by weight, bleed-out from the surface of the resin may occur and the impact resistance is reduced.

Component (F)

Component (F) is an oligomer-type polymer containing a functional group.

The functional group may be amino, epoxy, hydroxy, isocyanate, phenoxy, or amide groups. Component (F) contains at least one of these functional groups.

The oligomer-type polymer contains 1–30, and preferably 3–25, recurring units, and has a polystyrene-base molecular weight of 100–10,000, preferably 110–8,000, measured by GPC.

Specific examples of oligomer-type polymers containing a functional group are given below, but not limited thereto.

Bisphenol A epichlorohydrin, alicyclic epoxy resins, and the like are given as examples of the epoxy resin. Specific commercially available epoxy resins are YD series (trademark) resins manufactured by Toto Kasei Co., Ltd. Phenol resins containing epoxy group can also be used. Such phenol resins are available from Ciba Gaigee under the trademark of Araldite. Novolac resins also included in this type of phenol resins.

Terpen-phenol resins, polyvinyl alcohol, and novolac-type epoxy resins are given as examples of the resins containing hydroxy group.

MDI Millionate (trademark, manufactured by Nippon Polyurethane Co., Ltd.) is given as a typical example of the oligomers containing isocyanate group.

As examples of resins containing amino or amide group, guanamine resins and bismaleimide resins are given. A specific commercially available product is BT Resin (trademark, manufactured by Mitsubishi Gas Chemical Co., Ltd.).

Oligomers of bisphenol A with the terminals sealed with phenyl group are given as examples of the phenoxy resin. Specific commercially available phenoxy resins are YP series (trademark) resins manufactured by Toto Kasei Co., Ltd.

The amount of the component (F) used in the composition of the present invention is 0–40 parts by weight, preferably 0.5–30 parts by weight, and more preferably 1–25 parts by weight, for 100 parts by weight of said rubber-reinforced resin (R). If this amount is more than 40 parts by weight, the impact strength is impaired and the appearance of the molded products is poor.

Component (G)

Component (G) is one or more compounds selected from the group consisting of (G-1) compounds containing metal, (G-2) compounds containing silicon, and (G-3) polytetrafluoroethylene. Component (G) has a function of preventing dripping during combustion without adversely affecting the moldability and impact strength.

The compound containing metal Component (G-1) is specifically at least one compound of a metal selected from the transition metals in the fourth Period, Group IV metals, and Group V metals, excluding antimony (Sb), in the Periodic Table.

Titanium, iron, nickel, zinc, germanium, chromium, tin, bismuth, and molybdenum are given as examples of the metals. Preferred metal-containing compounds are compounds containing iron, zinc, or chromium.

Zinc borate, zinc methacrylate, and the like are given as examples of the compounds containing zinc.

Given as examples of compounds containing iron are ferrocene, iron (II) lactate, iron (III) lactate, iron (III) acetyl acetone, iron (II) citrate, iron (III) citrate, iron ammonium alum, iron (II) fumarate, iron naphthenate, iron oxalate, iron (III) stearate, iron (II) sulfamate, iron (II) tartarate, iron nonacarbonyl, iron pentacarbonyl, iron (II) oxide, and iron (III) oxide.

Among these iron compounds, especially preferred are ferrocene, iron (II) lactate, iron (III) lactate, iron (II) oxide, and iron (III) oxide. Organic iron compounds are preferred in view of superior dispersibility, and, in particular, iron (II) lactate and iron (III) lactate are desirable compounds because they impart no color.

Chromium oxide is a preferable example of the chromium-containing compound.

Typical compounds containing silicon (G-2) are organic silicon-containing compounds, and include silicone oils, silicone oils modified with a functional group, silane coupling agents, and polyorganosiloxane-reinforced resins. Polydimethylsiloxane, polymethylphenylsiloxane, and polydiphenylsiloxane are named as examples of silicone oils. Silicone oils with the main chain, side chains, or terminals modified with epoxy, amino, or hydroxy groups are also preferably used.

As specific examples of silane coupling agents, gamma-glycidoxypropyltrimethoxysilane, gamma-glycidoxypropylmethyldiketoxysilane, aminosilane, and gamma-methacryloxypropylmethyldimethoxysilane can be given.

Polyorganosiloxane-reinforced resins used in the present invention are defined as the resins obtained by the polymerization of a polyorganosiloxane-type polymer (h) of an amount of 5–90 parts by weight, preferably 10–70 parts by weight, and more preferably 20–60 parts by weight, and a vinyl monomer (i) of an amount of 95–10 parts by weight, preferably 90–30 parts by weight, and more preferably 80–40 parts by weight, provided that (h) +(i)=100 parts by weight.

Polyorganosiloxanes obtained by co-condensation of a graft crossing agent can be used as the polyorgano- siloxane-type polymer (h). In this instance, the graft crossing agent is used in an amount, preferably, of 0.5–5% by weight of the polyorganosiloxane-type polymer (h). With the amount of the graft crossing agent within this range, a polyorganosiloxane-type polymer (h) having favorable properties can be obtained, which results in the target flame retarding resin composition of the present invention with greatly improved characteristics.

The organosiloxanes here are defined as the compounds containing a structural unit represented by the general formula $R^1_n SiO_{(4-n)/2}$, wherein $R^1$ is a substituted or unsubstituted monovalent hydrocarbon group, and n is an integer of 0 to 3. They may have a linear, branched, or cyclic structure, with those having a cyclic structure being preferred.

Methyl, ethyl, propyl, vinyl, and phenyl groups are given as examples of the hydrocarbon group. These hydrocarbon groups with the hydrogen atoms being substituted with halogen atoms or cyano groups may also be used.

Specific examples of organosiloxanes include cyclic organosiloxanes, such as hexamethylcyclotrisiloxane, octamethylcyclotetrasiloxane, decamethylcyclopentasiloxane, dodecamethylcyclohexasiloxane, and trimethyltriphenylcyclotrisiloxane, as well as linear or branched polyorganosiloxanes.

These polyorganosiloxanes may be a condensed polyorganosiloxane having a styrene-base molecular weight of, for example, about 500–10,000.

When the organosiloxane is a polyorganosiloxane, its terminals may be blocked with such groups as hydroxy group, alkoxy group, trimethylsilyl group, dimethylvinylsilyl group, or methylphenylvinylsilyl group.

Given as specific examples of the graft crossing agent used in the present invention include, p-vinylphenylmethyldimethoxysilane, 2-(m-vinylphenyl)ethylmethyldimethoxysilane, 2-(o-vinylphenyl)ethylmethyldimethoxysilane, 1-(m-vinylphenyl)ethylmethyldimethoxysilane, 1-(o-vinylphenyl)ethylmethyldimethoxysilane, and 3-(p-vinylbenzoyloxy)propylmethyldimethoxysilane. A more desirable graft crossing agent is p-vinylphenyl-methyldimethoxysilane.

The use of these graft crossing agents promotes the graft ratio of the resulting resin composition, providing ideal characteristics of the composition which is the target of the present invention.

A polystyrene-base molecular weight of the polyorganosiloxane-type polymer (h) thus obtained is typically about 10,000–1,000,000, and preferably 50,000–500,000.

The polyorganosiloxane-reinforced resin is the polymer obtained by the copolymerization of a vinyl monomer (i) in the presence of such a polyorganosiloxane-type polymer (h).

The vinyl monomer (i) used in this copolymerization reaction may be monomers used in the preparation of the component (R), and includes aromatic vinyl compounds (a), cyanated vinyl compounds (b), (meth)acrylic acid esters, maleic anhydride, and maleimide-type compounds (d). These may be used either singly or as a mixture. All previously mentioned vinyl monomers of these types can be used here.

Tetrafluoroethylene having an average diameter of 50–1000 μm, a density of 100–1000 g/l, a melting point of 250–350° C., and a specific gravity of 1.8–2.5 can be used as component (G-3). Teflon (trademark) is given as a typical tetrafluoroethylene.

The amount of the component (G) used in the composition of the present invention is 0–30 parts by weight, preferably 1–20 parts by weight, and more preferably 1–15 parts by weight, for 100 parts by weight of said rubber-reinforced resin (R). If this amount is more than 30 parts by weight, the impact strength is impaired and the appearance of the molded products is poor.

Component (H)

Component (H) is one or more styrene-type resins selected from the group consisting of (H-1) maleic anhydride-styrene copolymers, (H-2) syndiotactic polystyrenes, and (H-3) resins containing α-methylstyrene.

Component (H-1) is a copolymer of maleic anhydride and styrene. Other copolymerizable monomers may be optionally included. Cyanated vinyl compounds (b), (meth)acrylic acid and derivatives thereof, and aromatic vinyl compounds (a), which are previously mentioned as monomers for preparing component (R), can be used as the other polymerizable monomers.

A typical preferred copolymerization composition consists of 1–90% by weight of maleic anhydride, 10–99% by weight of styrene, and 0–60% by weight of other monomers.

Illustrating syndiotactic polystyrenes (H-2), these are styrene-type polymer having a syndiotactic structure.

The syndiotactic structure here is defined as the configuration containing the syndiotactic structure as a major steric configuration, i.e, the steric configuration in which branched chains, such as phenyl groups or substituted phenyl groups, lie alternately above and below the plane of the primary carbon-carbon chain. Its tacticity can be quantitatively measured by the $^{13}$C-NMR method using isotope carbons. The tacticity determined by the $^{13}$C-NMR method can be indicated by the relative numbers of plurality of consecutive construction units, for example, "dyads" if the number of the construction units is two; "triads", if the number is three; and "pentads", if the number is five. Typically, syndiotactic polystyrene is polystyrene, poly(alkylstyrene), poly(halogenated-styrene), poly(alkoxystyrene), or poly(vinylbenzoic acid ester) having 75% or more, preferably 85% or more, of dyads syndiotacticity, or having 36% or more, preferably 50% or more, of pentads (racemic pentads) syndiotacticity, as well as mixtures of these and copolymers containing these polymers as a major component.

Poly(alkylstyrene) here includes poly(methylstyrene), poly(ethylstyrene), poly(isopropylstyrene), poly(t-butylstyrene), and the like; poly(halogenated-styrene) includes poly(chlorostyrene), poly(bromostyrene), poly(fluorostyrene), and the like; poly(alkoxystyrene) include poly(methoxystyrene), poly(ethoxystyrene), and the like.

Especially preferred polystyrene-type polymers among these are polystyrene, poly(m-methylstyrene), poly(p-t-butylstyrene), poly(p-chlorostyrene), poly(m-chlorostyrene), poly(p-fluorostyrene), and copolymer of styrene and p-methylstyrene.

Although there are no specific limitations to the molecular weight of syndiotactic polystyrenes (H-2) used in the present invention, those having a weight average molecular weight of 10,000 or more, especially 50,000 or more, are preferred. If the weight average molecular weight is smaller than 10,000, the heat resistance and mechanical strength of the syndiotactic polystyrene are inadequate. Such a polystyrene exhibits no sufficient effects when incorporated in the resin composition of the present invention. There are also no specific limitations to the molecular weight distribution of syndiotactic polystyrenes. Syndiotactic polystyrenes with various molecular weight distributions can be used.

The resins containing -methylstyrene (H-3) are copolymers of α-methylstyrene and other monomers, and include reinforced rubbers produced by polymerizing α-methylstyrene or the like in the presence of a rubbery polymer.

The rubbery polymer and other monomers used for producing the resins containing α-methylstyrene (H-3) may be those used for preparing rubber-reinforced resins (A) and (B) for component (R), and include the above-mentioned aromatic vinyl compounds (a), cyanated vinyl compounds (b), monomers containing a functional group, and maleimide compounds (d).

A typical resin containing α-methylstyrene (H-3) comprises 0–90% by weight, preferably 0–60% by weight, of a rubbery polymer, 1–90% by weight of α-methylstyrene, 10–90% by weight of an aromatic vinyl monomer (a), and 0–90% by weight, preferably 2–60% by weight of a cyanated vinyl compound (b).

When a rubbery polymer is used, the graft ratio of the rubber-reinforced resin containing α-methylstyrene affects the flame retarding and other properties of the resulting resin composition. The graft ratio of the resin containing α-methylstyrene (H-3) is typically 5–150% by weight, preferably 10–150% by weight, and more preferably 10–120% by weight. If the graft ratio is smaller than 5%, the effect of the addition of the rubbery component is not sufficiently exhibited, e.g., impact resistance is insufficient; if it is greater than 150%, the moldability is impaired.

The graft ratio is defined to be a percentage determined by the following formula, $$\text{Graft Ratio } (\%) = \{(y-x)/x\} \times 100$$

wherein x is the amount of rubbery components in 1 g of the rubber-reinforced resin containing α-methylstyrene (H-3) and y is the methyl ethyl ketone insoluble components in 1 g of this resin.

The intrinsic viscosity [η] of the matrix resin in the rubber-reinforced resin containing α-methylstyrene (H-3), measured in methyl ethyl ketone at 30° C., is 0.1 to 1.5 dl/g, and preferably 0.3 to 1.0 dl/g. If the intrinsic viscosity [η] is smaller than 0.1 dl/g, the impact strength is insufficient; if it is greater than 1.5 dl/g, the molding processability is inadequate.

The matrix resin is the resin components other than grafted rubber components in the rubber-reinforced resin containing α-methylstyrene (H-3), and the intrinsic viscosity [η] can be determined by measuring the amount of components soluble in methyl ethyl ketone contained in the rubber-reinforced resins (H-3) by a conventional method.

The amount of the component (H) incorporated in the composition of the present invention is 0–300 parts by weight, preferably 5–200 parts by weight, and more preferably 10–150 parts by weight, for 100 parts by weight of said rubber-reinforced resin (R). If this amount is more than 300 parts by weight, the moldability is decreased.

The flame retarding resin composition of the present invention can be used independently or, if required, can be used blended with other resin materials. The proportion of the flame retarding resin composition of the present invention, when blended with other resin materials, is 5–95% by weight, preferably 30–95% by weight, and more preferably 60–95% by weight, while the other resin materials are blended at a proportion of 95–5% by weight, preferably 70–5% by weight, and more preferably 40–5% by weight.

Given as examples of such other resin materials are polycarbonate, polyamides, such as nylon 6; polyesters, such as polybutylene terephthalate (PBT), polyethylene terephthalate (PET), polyphenylene sulfide (PPS), polyphenylene oxide (PPO); polyacetals, such as polyoxymethylene (POM); polyether-ester amides; polyether imides; polyimides; polyether-ether ketones (PEEK); polyacrylates; methyl polymethacrylates; silicone resins; chlorine-containing polymers, such as polyvinyl chloride (PVC); fluorine-containing polymers; epoxy resins; polyurethanes; unsaturated polyesters; and thermoplastic elastomers. Of these, polycarbonate, polyamides, PBT, PET, PPS, and PPO are preferred.

The use of a compatiblizer which assists to increase the mutual dissolution among polymers in the manufacture of blends from the flame retarding resin composition of the present invention and other resin materials can promote impact resistance and outward appearance of molded products. As a mutual dissolution method, a method is given, wherein the mixture is kneaded in the presence of an unsaturated compound having at least one functional group selected from the group consisting of acid anhydride group, hydroxy group, amino group, epoxy group, oxazoline group, and imide group, and, optionally, further in the presence of a peroxide. Another example of mutual dissolution method comprises the use of other polymers having these functional groups. Such other polymers include random, block, or graft copolymers prepared from said unsaturated compounds having functional groups and other vinyl monomers copolymerizable with these unsaturated compounds.

Given as specific examples of compatiblizers are copolymers obtained by the copolymerization of styrene, said unsaturated compounds having functional groups, and optionally, other vinyl monomers copolymerizable with such unsaturated compounds, such as styrene-glycidyl methacrylate copolymer, styrene-maleic anhydride copolymer, styrene-methacrylic acid copolymer, styrene-acrylonitrile-methacrylic acid copolymer, and the like; and copolymers obtained by the copolymerization of ethylene, said unsaturated compounds having functional groups, and optionally, other vinyl monomers copolymerizable with such unsaturated compounds, such as ethylene-glycidyl methacrylate copolymer, ethylene-glycidyl methacrylate-vinyl acetate copolymer, and the like. Included in these copolymers are graft copolymers obtained by grafting other polymers on said ethylene copolymers. Such other polymers which can be grafted include polymers obtained using radically polymerizable vinyl monomers, such as, for example, poly(meth)acrylic acid alkyl esters, polystyrene, styrene-acrylonitrile copolymer, styrene-(meth)acrylic acid alkyl ester copolymer, and the like.

The flame retarding resin composition of the present invention can be manufactured by kneading the above-mentioned components by an extruder, Bumbury's mixer, kneader, roll, or the like, preferably at a temperature range of 200 to 350° C. All components may be kneaded altogether, or a multi-stage divisional kneading method may be employed, in which any optional components are kneaded first and other components are added, followed by further kneading. The use of an extruder is preferred for the kneading. A biaxial equidirectional-rotation extruder is particularly preferred.

Other additives can be mixed into the flame retarding resin composition of the present invention, as required. Such additives include antioxidants, stabilizers, such as ultraviolet absorbents; lubricants, such as low molecular weight polyethylene; fillers, such as calcium carbonate, talc, clay, titanium oxide, antimony oxide, magnesium oxide, aluminum hydroxide, magnesium hydroxide, magnesium carbonate, carbon black, barium sulfate, calcium oxide, aluminum oxide, mica, glass beads, glass fiber, carbon fiber, alamide fiber, glass flake, thermally swellable carbon, and metal fillers; dispersants; foaming agents; and colorants. Among glass fibers and carbon fibers, those having a diameter of 6–60 μm and a fiber length of longer than 30 μm are preferred.

The amount of these additives in the composition of the present invention is preferably 0.01–150 parts by weight for 100 parts by weight of the composition.

The flame retarding resin composition of the present invention can be formed into products by extrusion molding, injection molding, compression molding, or the like. The products formed are superior in flame retardancy, impact resistance, heat resistance, and molding processability, and also have a good external appearance. For this reason, they are extremely useful for household products, electrical appliances, OA equipment, and the like, and for automotive products and building materials.

Other features of the invention will become apparent in the course of the following description of the exemplary embodiments which are given for illustration of the invention and are not intended to be limiting thereof.

In the Examples and Comparative Examples below, "parts" and "%" means "part(s) by weight" and "% by weight" unless otherwise designated.

EXAMPLES

Examples 1–7, Comparative Examples 1–5

Preparation rubber-reinforced resin

The following graft copolymers were used as the rubber-reinforced resins. Graft copolymer (A-1):

A graft copolymer was prepared by the following method from monomers of composition (A-1) shown in Table 1.

Into a separable flask equipped with a reflux condenser, a thermometer, and a stirrer, were charged, as initial components, 40 parts (as solid portion) of polybutadiene rubber latex, 65 parts of ion-exchanged water, 0.35 part of rosin soap, 15 parts of styrene, and 5 parts of acrylonitrile. A solution of 0.2 part of sodium pyrrophosphate, 0.01 part of $FeSO_4 \cdot 7H_2O$, and 0.4 part of glucose dissolved in 20 parts of ion-exchanged water was added to the above mixture. Then, 0.07 part of cumene hydroperoxide was added to initiate the polymerization. After one hour of the polymerization, 45 parts of ion exchanged water, 0.7 part of rosin soap, 30 parts of styrene, 10 parts of acrylonitrile, and 0.01 part of cumene hydroperoxide, as incremental components, were added continuously over a period of two hours, followed by additional one hour polymerization to complete the reaction. The copolymer latex obtained in this manner was coagulated with the addition of sulfuric acid, washed with water, and dried, to obtain graft copolymer (A-1).

Graft copolymers (A-2) to (A-6):

Graft copolymers (A-2) to (A-6) were prepared in the same manner as the graft copolymer (A-1), from monomers of the compositions (A-2) to (A-6), respectively, shown in terms of ratio of the initial charge and the incremental charge in Table 1.

TABLE 1

| | Monomer composition (initial charge/incremental charge) | | | | | |
|---|---|---|---|---|---|---|
| | Graft copolymer | | | | | |
| Monomer | (A-1) | (A-2) | (A-3) | (A-4) | (A-5) | (A-6) |
| Polybutadiene (Gel content = 10%) | 40/0 | 40/0 | 40/0 | — | — | — |
| Polybutadiene (Gel content = 98%) | — | — | — | 40/0 | 40/0 | 40/0 |
| Styrene | 15/30 | 10/20 | 13/20 | 15/30 | 10/20 | 13/20 |
| t-Butoxystyrene | — | 2.5/5 | — | — | 2.5/5 | — |
| p-Methylstyrene | — | 2.5/5 | — | — | 2.5/5 | — |
| Acrylonitrile | 5/10 | 5/10 | 5/10 | 5/10 | 5/10 | 5/10 |
| Glycidylmethacrylate | — | — | 1/5 | — | — | 1/5 |
| 2-Hydroxyethylmethacylate | — | — | 1/5 | — | — | 1/5 |
| Graft ratio (%) *1 | 60 | 53 | 65 | 55 | 53 | 64 |

*1 The graft ratio (%) can be determined by the application of the following equation.
Graft Ratio (%) = $\{(y - x)/x\} \times 100$
wherein x is the amount of rubbery components in 1 g of the graft copolymer and y is an amount of the materials, which are insoluble in methyl ethyl ketone, contained in 1 g of the graft copolymer.

Copolymer (B-1):

Into a separable flask equipped with a reflux condenser, a thermometer, and a stirrer, were charged 250 parts of ion-exchanged water, 3.0 parts of potassium rosinate, 75 parts of styrene, 25 parts of acrylonitrile, and 0.1 part of t-dodecylmercaptane. A solution of 0.05 part of sodium ethylenediaminetetraacetate, 0.002 part of $FeSO_4 \cdot 7H_2O$, and 0.1 part of sodium formaldehyde sulfoxylate dissolved in 8 parts of ion-exchanged water was added to the above mixture. Then, 0.1 part of diisopropylbenzene hydroperoxide was added to initiate the polymerization. The reaction was terminated after about one hour of the polymerization. The copolymer latex obtained in this manner was coagulated with the addition of sulfuric acid, washed with water, and dried, to obtain copolymer (B-1).

Maleimide-type copolymer (B-2):

A maleimide-type copolymer (B-2) consisting of N-phenylmaleimide, maleic anhydride, and styrene at a ratio by weight of 50:3:47 was prepared.

Maleimide-type copolymer (B-3):

A maleimide-type copolymer (B-3) consisting of N-phenylmaleimide, styrene, acrylonitrile, and 2-hydroxy-ethylmethacrylate at a ratio by weight of 30:50:15:5 was prepared.

Phenol resin (C)

A novolac-type phenol resin, Tamanole 759 (trademark, manufactured by Arakawa Chemical Co., Ltd.) was used.

Organic phosphorus compound (D)

Triphenylphosphate (D-1) and trixylenylphosphate (D-2) were used as organic phosphorus-containing compounds.

Nitrogen-containing compound (E)

Trishydroxyethylisocyanate (THEIC) manufactured by Nissan Chemical Co., Ltd. was used as the nitrogen-containing compound.

Oligomer-type polymer containing a functional group (F)

An oligomer containing a functional group, MDI Millionate MR-400 (an isocyanate-containing oiligomer: trademark, manufactured by Nippon Polyurethane Co.) was used.
Component (G)

(G-1): chromium oxide was used as the compound containing metal.

(G-2): Methabrene S2001 (trademark, manufactured by Mitsubishi Rayon Co., Ltd.) was used as the compound containing silicon.

(G-3): As polytetrafluoroethylene, F-103 (trademark, manufactured by Daikin Kogyo Co., Ltd.) having an average diameter of 500 μm, a density of 600 g/l, and a melting point of 326°–328° C., was used.
Styrene-type resin (H)

(H-1): As the maleic anhydride-styrene copolymer, Moremax UG461 (trademark, manufactured by Idemitsu Petrochemical Co., Ltd.) was used.

(H-2): A syndiotactic polystyrene prepared by the polymerization of styrene in the presence of an inert hydrocarbon solvent, such as toluene, using a catalyst comprising a titanium compound, water and trialkyl aluminum, and having a triads syndiotacticity of 85% was used.

(H-3): A resin polymerized by 15% of polybutadien, 43% of α-methylstyrene, 17% of styrene, and 25% of acrylonitrile was used as the resin containing α-methylstyrene.
Other resin material Polycarbonate was used as other resin material.
Preparation and evaluation of flame retarding resin compositions The components shown in Table 2 were melted and kneaded at a temperature range of 190°–240° C., and extruded from an extruder with an inner diameter of 50 mm to produce pellets. Test specimens were prepared from these pellets at a temperature range of 200°–240° C., using a 5 oz. injection molding machine to evaluate their characteristics on the following items.
Combustion test Combustion test conformed to UL-94. Size of test leaf: $\frac{1}{16}" \times \frac{1}{2}" \times 5"$
Izod impact strength ASTM D256 ($\frac{1}{4}"$, 23° C., notched)
Heat deformation test ASTM D648 (18.6 kg/cm$^2$) The results are shown in Tables 2-1 and 2-2.
Moldability Molding processability was evaluated during molding operation and graded as follows.

AAA: The resin composition was easily molded.

BBB: Moldability was fair.

CCC: Moldability was bad.
Heat stability during molding

Heat stability was evaluated by the outward appearance of molded products after the resin compositions have been retained in a injection molding machine.

AAA: Heat stability was good.

BBB: Heat stability was fair.

CCC: Heat stability was bad.

TABLE 2-1

| | (Example Compositions 1–7) | | | | | | |
|---|---|---|---|---|---|---|---|
| | 1 | 2 | 3 | 4 | 5 | 6 | 7 |
| Rubber-reinforced resin (parts) | | | | | | | |
| Graft copolymer (A-1) | 40 | — | — | — | — | — | — |
| Graft copolymer (A-2) | — | 40 | — | — | — | — | — |
| Graft copolymer (A-3) | — | — | 40 | — | — | — | — |
| Graft copolymer (A-4) | — | — | — | 50 | — | — | 50 |
| Graft copolymer (A-5) | — | — | — | — | 50 | — | — |
| Graft copolymer (A-6) | — | — | — | — | — | 40 | — |
| Copolymer (B-1) | 60 | 30 | 30 | 30 | 30 | 30 | 30 |
| Maleimide copolymer (B-2) | 0 | 0 | 0 | 20 | 20 | 0 | 20 |
| Maleimide copolymer (B-3) | 0 | 30 | 30 | 0 | 0 | 30 | 0 |
| Type of rubber-reinforced resin* | LG | LG | LG,(c) | HG | HG | HG,(c) | HG |
| Gel content of rubbery polymer before polymerization (%) | 10 | 10 | 10 | 98 | 98 | 98 | 98 |
| Content of component (c) in rubber-reinforced resin (R) (%) | 0 | 1.5 | 6.3 | 0 | 0 | 6.3 | 0 |
| Content of component (d) in rubber-reinforced resin (R) (%) | 0 | 9 | 9 | 10.6 | 10.6 | 9 | 10.6 |
| Flame retarding resin composition (parts) | | | | | | | |
| Rubber-reinforced resin | | | | | | | |
| (C) Novolac-type phenol resin | 15 | 15 | 20 | 15 | 20 | 20 | 15 |
| (D-1) Triphenylphosphate | 25 | 20 | 20 | 0 | 0 | 0 | 0 |
| (D-2) Trixylenylphosphate | 0 | 0 | 0 | 25 | 25 | 20 | 25 |
| (E) Trishydroxyethylisocyanate | 0 | 0 | 0 | 0 | 1 | 1 | 0 |
| (F) Isocyanate containig-oligomer | 0 | 0 | 0 | 3 | 0 | 1 | 0 |
| (G-1) Cr$_2$O$_3$ | 0 | 0 | 0 | 0 | 0.5 | 0 | 0 |
| (G-2) Methabrene S2001 | 0 | 0 | 2 | 0 | 0 | 0 | 0 |
| (G-3) Polytetrafluoroethylene | 0 | 0.5 | 0 | 0 | 0 | 0 | 1 |
| (H-1) Maleic anhydride-styrene copolymer | 0 | 0 | 10 | 0 | 0 | 0 | 5 |
| (H-2) Syndiotactic polystyrene | 0 | 15 | 0 | 0 | 0 | 0 | 0 |
| (H-3) Resin containing α-methylstyrene | 0 | 0 | 0 | 0 | 20 | 0 | 0 |
| Flame retarding resin composition of the present invention (wt %) | — | — | — | — | — | — | 50 |
| Other resin (polycarbonate) (wt %) | — | — | — | — | — | — | 50 |

TABLE 2-1-continued

| (Example Compositions 1–7) | | | | | | | |
|---|---|---|---|---|---|---|---|
| | 1 | 2 | 3 | 4 | 5 | 6 | 7 |
| Results of Evaluation | | | | | | | |
| Flame retarding properties: UL-94 (thickness 1/6") | V-1 | V-0 | V-0 | V-0 | V-0 | V-0 | V-0 |
| Izodt impact strength (kg · cm/cm) | 8 | 9 | 8 | 12 | 13 | 12 | 14 |
| Heat deformation temperature (°C.) | 80 | 85 | 85 | 88 | 88 | 83 | 90 |
| Moldability | AAA | AAA | AAA | AAA | AAA | AAA | AAA |
| Heat stability during molding | AAA | AAA | AAA | AAA | AAA | AAA | AAA |

*HG = high gel content, LG = low gel content, (c) = component (c) is contained.

TABLE 2-2

| (Comparative Compositions 1–5) | | | | | |
|---|---|---|---|---|---|
| | 1 | 2 | 3 | 4 | 5 |
| Rubber-reinforced resin (parts) | | | | | |
| Graft copolymer (A-1) | — | 40 | — | — | — |
| Graft copolymer (A-2) | — | — | 40 | — | — |
| Graft copolymer (A-3) | — | — | — | — | — |
| Graft copolymer (A-4) | 40 | — | — | 40 | — |
| Graft copolymer (A-5) | — | — | — | — | — |
| Graft copolymer (A-6) | — | — | — | — | 40 |
| Copolymer (B-1) | 30 | 60 | 0 | 30 | 30 |
| Maleimide copolymer (B-2) | 0 | 0 | 60 | 30 | — |
| Maleimide copolymer (B-3) | 30 | 0 | 0 | 0 | 30 |
| Type of rubber-reinforced resin* | HG | LG | LG | HG | HG,(c) |
| Gel proportion of rubbery polymer before polymerization (%) | 98 | 10 | 10 | 98 | 98 |
| Content of component (c) in rubber-reinforced resin (R) (%) | 1.5 | 0 | 6 | 0 | 6.3 |
| Content of component (d) in rubber-reinforced resin (R) (%) | 9 | 0 | 31.8 | 15.9 | 9 |
| Flame retarding resin composition (parts) | | | | | |
| Rubber-reinforced resin | — | — | — | — | — |
| (C) Novolac-type phenol resin | 0 | 220 | 15 | 15 | 15 |
| (D-1) Triphenylphosphate | 0 | 25 | 0 | 0 | 25 |
| (D-2) Trixylenylphosphate | 0 | 0 | 230 | 25 | 0 |
| (E) Trishydroxyethylisocyanate | 0 | 10 | 15 | 50 | 0 |
| (F) Isocyanate containig-oligomer | 0 | 0 | 0 | 45 | 0 |
| (G-1) $Cr_2O_3$ | 40 | 0 | 0 | 0 | 0 |
| (G-2) Methabrene S2001 | 0 | 0 | 0 | 0 | 0 |
| (G-3) Polytetrafluoroethylene | 0 | 0 | 0 | 0 | 0 |
| (H-1) Maleic anhydride-styrene copolymer | 0 | 10 | 0 | 0 | 0 |
| (H-2) Syndiotactic polystyrene | 0 | 0 | 0 | 0 | 350 |
| (H-3) Resin containing α-methylstyrene | 0 | 0 | 50 | 0 | 0 |
| Flame retarding resin composition of the present invention (wt %) | — | — | — | — | — |
| Other resin (polycarbonate) (wt %) | — | — | — | — | — |
| Results of Evaluation | | | | | |
| Flame retarding properties: UL-94 (thickness 1/6")* | not V | V-0 | V-2 | V-0 | not V |
| Izodt impact strength (kg · cm/cm) | 2 | 1 | 1 | 2 | 1 |
| Heat deformation temperature (°C.) | 95 | 55 | 50 | 70 | 95 |
| Moldability | AAA | CCC | CCC | CCC | CCC |
| Heat stability during molding | CCC | CCC | CCC | CCC | CCC |

* HG = high gel content, LG = low gel content, (c) = component (c) is contained.

As clearly seen in Tables 2-1 and 2-2, the target flame retarding resin compositions of the present invention were obtained in Examples 1–7, all exhibiting superior flame retarding properties and other excellent characteristics. In contrast, the composition of Comparative Example 1, which contained components (C) and (D) in amounts below the range specified in the present invention, exhibited insufficient flame retarding effects. It contained an amount of component (G) above the defined range, and thus its impact strength was inferior. The composition of Comparative Example 2, which contained an amount of component (C) above the range specified in the present invention, exhibited a low impact strength. The composition of Comparative Example 3, which contained an amount of component (D) above the range specified in the present invention, exhibited a low heat deformation temperature. The composition of Comparative Example 4, which contained an amount of component (F) above the range specified in the present invention, exhibited a low impact strength. The composition of Comparative Example 5, which contained an amount of component (H) above the range specified in the present invention, exhibited a low impact strength.

Obviously, numerous modifications and variations of the present invention are possible in light of the above teachings. It is therefore to be understood that within the scope of the appended claims, the invention may be practiced otherwise than as specifically described herein.

We claim:

1. A flame retarding resin composition, comprising:

(Z) 100 parts by weight of at least one rubber-reinforced resin, which comprises:

(A) a rubber-reinforced resin, which is:
(i) a graft copolymer obtained by the polymerization of a monomer mixture, comprising (a) at least one aromatic vinyl compound and (b) at least one cyanated vinyl compound in the presence of a rubbery polymer having a gel content of 2–50% by weight, or
(ii) a mixture of this graft polymer and a polymer obtained by the polymerization of at least one monomer selected from the group consisting of (a) aromatic vinyl compounds, (b) cyanated vinyl compounds and (c) at least one monomer selected from the group consisting of:
(c1) an epoxy group-containing monomer,
(c2) a hydroxy-group-containing monomer,
(c3) a carboxyl group-containing monomer,
(c4) an amide group-containing monomer, and
(c5) a compound of the formula:

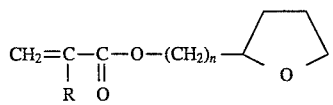

wherein R is a hydrogen atom or hydrocarbon group, and n is an integer of 1–4, and wherein the amount of the monomers containing the at least one monomer c) is 0.5–40% by weight of said component (R);

wherein the content of the at least one monomer (c) in component (A) is 0–40% by weight, or (B) a rubber-reinforced resin, which is:
(i) a graft copolymer obtained by the polymerization of a monomer mixture comprising (a) at least one aromatic vinyl compound and (b) at least one cyanated vinyl compound in the presence of a rubbery polymer having a gel content of at least 2% by weight, or
(ii) a mixture of this graft copolymer and a polymer obtained by the polymerization of at least one monomer selected from the group consisting of (a) aromatic vinyl compounds, (b) cyanated vinyl compounds (c) at least one monomer selected from the group consisting of one or more monomers as defined above in (c1)–(c5), and d) maleimide compounds;

wherein the content of the at least one monomer (c) and the maleimide compounds (d) in component (B) is 0–40% by weight and 5–50% by weight, respectively, or a combination of any of the above;

(C) 1–200 parts by weight of a phenol resin; and (D) 1–200 parts by weight of an organic phosphorus-containing compound selected from the group consisting of trixylenylphosphate and triphenylphosphate; and wherein said resin and said organic phosphorus-containing compound remain unreacted in the composition.

2. The composition according to claim 1, wherein the gel content of the rubbery polymer for producing component (A) is 5–40% by weight.

3. The composition according to claim 1, wherein the gel content of the rubbery polymer for producing component (B) is 50% by weight or more.

4. The composition according to claim 1, wherein the graft ratio of the graft polymers in (A) and (B) is 5–150% by weight.

5. The composition according to claim 1, wherein said phenol resin (C) is a Novolac-type phenol resin.

6. The composition according to claim 1, wherein said monomer mixture for obtaining said graft copolymer of component (A) further comprises (c) one or more monomers containing a functional group.

7. The composition according to claim 1, wherein said monomer mixture for obtaining said graft copolymer of component (B) further comprises (c) one or more monomers containing a functional group or (d) one or more maleimide compounds, or both.

8. The composition according to claim 1, further comprising, for 100 parts by weight of the rubber-reinforced resin (Z), one or more compounds selected from the group consisting of, (E) less than 50 parts by weight of a compound containing nitrogen;
(F) less than 40 parts by weight of an oligomer-type polymer containing a functional group;
(G) less than 30 parts by weight of one or more compounds selected from the group consisting of,
(G-1) compounds containing metal,
(G-2) compounds containing silicon, and
(G-3) polytetrafluoroethylene; and
(H) less than 300 parts by weight of one or more styrene-type resins selected from the group consisting of,
(H-1) maleic anhydride-styrene copolymer,
(H-2) syndiotactic polystyrene, and
(H-3) resins containing α-methylstyrene.

9. The composition according to claim 8, wherein the compound containing nitrogen (E) is one or more compounds selected from the group consisting of triazine and triazolysine.

10. The composition according to claim 8, wherein the oligomeric polymer containing a functional group (F) is one or more compounds selected from the group consisting of epoxy-modified novolac resins, isocyanate-containing resins, amino group-containing resins, amide group-containing resins, and phenoxy resins.

11. The composition according to claim 8, wherein the polystyrene base molecular weight of the oligomeric polymer containing a functional group (F) is 100–10,000.

12. The composition according to claim 8, wherein the compound containing metal (G-1) is at least one compound of a metal selected from transition metals in the fourth Period, Group IV metals, and Group V metals in the Element Periodic Table.

13. The composition according to claim 8, wherein the compound containing silicon (G-2) is at least one compound selected from the group consisting of polyorganosiloxanes, silicone oils, silicone oils modified with a functional group, and silane coupling agents.

14. The composition according to claim 1, wherein the monomer containing a functional group (c) used for producing said component (R) is at least one monomer selected from the group consisting of,
- (c-1) epoxy group-containing monomers,
- (c-2) hydroxy group-containing monomers,
- (c-3) carboxyl group-containing monomers,
- (c-4) amide group-containing monomers, and
- (c-5) compounds of the formula,

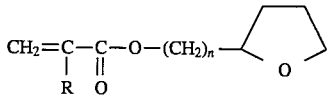

wherein R is a hydrogen atom or a hydrocarbon group and n is an integer of 1–4; and wherein the amount of the monomers containing the functional groups (c) is 0.5–40% by weight of said component (R).

15. The composition according to claim 1, wherein the aromatic vinyl compound (a) used for producing said component (R) is at least one compounds selected from the group consisting of,
- (a-1) alkoxystyrenes and
- (a-2) alkyl-substituted styrenes, and wherein the amount of the aromatic vinyl compounds (a-1) and (a-2) is 0.5–50% by weight of said component (R).

16. The composition according to claim 8, wherein the amount of the styrene-type resins (H) is 10–300 parts by weight for 100 parts by weight of the component (R).

17. The composition according to claim 8, wherein the amount of the compounds containing a functional group (c) is 0.1–40% by weight of said component (R), and the amount of the styrene-type resins (H) is 10–300 parts by weight for 100 parts by weight of the component (R).

18. The composition according to claim 1, wherein the amount of said component (D) is 1–100 parts by weight for 100 parts by weight of the rubber-reinforced resin (R).

19. The composition according to claim 1, wherein the amount of said component (D) is 5–50 parts by weight for 100 parts by weight of the rubber-reinforced resin (R).

20. A flame retardant resin composition, comprising:
   (Z) 100 parts by weight of at least one rubber-reinforced resin, which comprises;
   (A) a rubber-reinforced resin, which is:
     (i) a graft copolymer obtained by the polymerization of a monomer mixture, comprising (a) at least one aromatic vinyl compound and (b) at least one cyanated vinyl compound in the presence of a rubbery polymer having a gel content of 2–50% by weight, or
     (ii) a mixture of this graft polymer and a polymer obtained by the polymerization of at least one monomer selected from the group consisting of (a) aromatic vinyl compounds, (b) cyanated vinyl compounds and (c) at least one monomer selected from the group consisting of:
       (c1) an epoxy group-containing monomer,
       (c2) a hydroxy group-containing monomer,
       (c3) a carboxyl group-containing monomer,
       (c4) an amide group-containing monomer, and
       (c5) a compound of the formula:

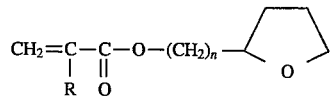

wherein R is a hydrogen atom or hydrocarbon group, and n is an integer of 1–4, and wherein the amount of the monomers containing the at least one monomer c) is 0.5–40% by weight of said component (R);
wherein the content of the at least one monomer (c) in component (A) is 0–50% by weight, or
(B) a rubber-reinforced resin, which is:
   (i) a graft copolymer obtained by the polymerization of a monomer mixture comprising: (a) at least one aromatic vinyl compound, and (b) at least one cyanated vinyl compound in the presence of a rubbery polymer having a gel content of at least 2% by weight, or
   (ii) a mixture of this graft copolymer and a polymer obtained by the polymerization of at least one monomer selected from the group consisting of (a) aromatic vinyl compounds, (b) cyanated vinyl compounds, (c) at least one monomer selected from the group consisting of one or more monomers as defined above in (c1)–(c5), and (d) maleimide compounds;
wherein the content of the at least one monomer (c) and maleimide compounds (d) in component (B) is 0–50% by weight and 5–60% by weight, respectively, or a combination of any of the above;
(C) 1–50 parts by weight of a phenol resin; and
(D) 1–50 parts by weight of an organic phosphorus-containing compound selected from the group consisting of trixylenylphosphate and triphenylphosphate;
(F) 0.05–40 parts by weight of an oligomeric polymer which is one or more compounds selected from the group consisting of epoxy-modified novolac resins, isocyanide-containing resin, amino group-containing resins, amide group-containing resins and phenoxy resins; and
(G) 0.5–30 parts by weight of one or more compounds selected from the group consisting of:
   (G-1) compounds containing metal,
   (G-2) compounds containing silicon, and
   (G-3) polytetrafluoroethylene; and wherein said resin and said organic phosphorus-containing compound remain unreacted in the composition.

* * * * *